United States Patent [19]

Kanoh et al.

[11] Patent Number: 4,963,213
[45] Date of Patent: Oct. 16, 1990

[54] METHOD OF AND DEVICE FOR GLUING OBJECTS TOGETHER USING A POROUS SHEET APPLICATOR

[75] Inventors: Kunihiko Kanoh, Togura; Tadaomi Sunohara, Kohshoku; Chushiro Hayasaka, Sayama, all of Japan

[73] Assignee: Morikawa Snagyo Kabushiki Kaisha, Nagano, Japan

[21] Appl. No.: 387,846

[22] Filed: Jul. 31, 1989

[51] Int. Cl.$^5$ .................. B32B 31/12; B32B 31/18
[52] U.S. Cl. .................................. 156/249; 118/243; 118/267; 118/271; 156/578
[58] Field of Search ............... 53/383; 118/243, 264, 118/267, 269, 271; 152/247, 249, 442.1, 441.5, 578

[56] References Cited

U.S. PATENT DOCUMENTS

| | | | |
|---|---|---|---|
| 1,850,575 | 3/1932 | Whitlock | 156/442.1 |
| 1,872,898 | 8/1932 | Cornock | 53/383 |
| 3,035,938 | 5/1962 | Schwinger | 53/383 X |
| 3,078,824 | 2/1963 | Bechle | 53/383 U |
| 3,088,433 | 5/1963 | Walter et al. | 53/383 U |
| 3,107,182 | 10/1963 | Anderson et al. | 118/267 X |
| 3,377,001 | 4/1968 | Hazard | 118/243 X |
| 3,628,982 | 12/1971 | Krug | 118/243 X |
| 3,700,530 | 10/1972 | Ehe | 156/578 X |
| 4,609,421 | 9/1986 | Yui | 156/442.1 |

Primary Examiner—Robert A. Dawson
Attorney, Agent, or Firm—Price, Heneveld, Cooper, DeWitt & Litton

[57] ABSTRACT

Disclosed are a method of and a device for gluing objects together in which adhesive agent is supplied to a flexible porous sheet, such as a net, that is suspended so as to allow it to be pulled down. The method and device are particularly applicable to objects having concavoconvex adhesion surfaces which are adapted to be engaged with each other; the objects are brought together in such a manner that they retain between their adhesion surfaces the porous sheet to which adhesive agent has been supplied. Afterwards, the objects are separated from each other, the porous sheet being pulled upwards. Then, the objects, to which adhesive agent has been applied, are brought together again so as to be glued to each other.

13 Claims, 5 Drawing Sheets

METHOD OF AND DEVICE FOR GLUING OBJECTS TOGETHER USING A POROUS SHEET APPLICATOR

BACKGROUND OF THE INVENTION

1. Field of the Invention

This invention relates to a method of and a device for gluing objects together.

More specifically, this invention relates to a method of and a device for gluing together objects having concavo-convex adhesion surfaces adapted to be engaged with each other.

2. Description of the Related Art

Conventionally, objects having concavo-convex adhesion surfaces as mentioned above have generally been glued to each other by manually applying adhesive agent to both adhesion surfaces of these objects and putting them together before the adhesive agent has been cured. This conventional method, however, is rather ineffective since it depends on manual operation. An idea might be readily conceived for mechanizing this gluing operation. However, this is hard to realize in the case where the objects to be glued together have concavo-convex adhesion surfaces.

SUMMARY OF THE INVENTION

This invention has been contrived with a view to overcoming the problem mentioned above. It is accordingly an object of this invention to provide a method which allows objects having concavo-convex adhesion surfaces that are to be engaged with each other to be glued to each other mechanically and, consequently, efficiently, as well as a device for practicing this method. The above object of this invention naturally covers the case where objects having flat adhesion surfaces are to be glued to each other.

Another object of this invention is to provide a method of and a device for gluing together the parts of a meltable pattern used for casting. Still another object of this invention is to provide a method of and a device for gluing objects together using a hot-melt type adhesive agent.

In order to achieve the above objects, the present invention provides a method of gluing objects together, comprising the steps of: preparing a flexible porous sheet having a multitude of pores, suspending the above-mentioned porous sheet so as to allow it to be pulled down, allowing adhesive agent to adhere to the multitude of pores of the above-mentioned porous sheet, bringing the adhesion surfaces of objects to be glued together into contact with the porous sheet on both sides thereof so as to allow the adhesive agent to adhere to the above-mentioned adhesion surfaces of the objects to be glued together, separating the above-mentioned adhesion surfaces from the porous sheet, and bringing together the adhesion surfaces before the adhesive agent has cured.

In a form of the above-mentioned method of gluing objects together in accordance with this invention, the above-mentioned sheet consists of a net.

In another form of the above-mentioned method of gluing objects together in accordance with this invention, the objects to be glued to each other consist of parts of a meltable pattern used for casting.

In still another form of the above-mentioned method of gluing objects together in accordance with this invention, the above-mentioned adhesive agent is a hot-melt type adhesive agent which is melted by heating.

In accordance with this invention, there is further provided a device for gluing objects together, comprising: a flexible porous sheet, a means for supplying adhesive agent to the above-mentioned porous sheet, a raising/lowering means for suspending the above-mentioned porous sheet so as to allow it to be pulled down, and a retaining/moving means provided on both sides of the above-mentioned porous sheet that is suspended and adapted to be used for retaining objects to be glued together and moving these objects in the direction of the above-mentioned porous sheet and in a direction reverse thereto.

In a form of the device for gluing objects together in accordance with this invention, the above-mentioned porous sheet consists of a net.

In another form of the device for gluing objects together in accordance with this invention, the above-mentioned adhesive agent is a hot-melt type adhesive agent, and the above-mentioned means for supplying adhesive agent to the above-mentioned porous sheet includes a heating device for heating the above-mentioned hot-melt type adhesive agent for the purpose of melting the same.

In still another form of the device for gluing objects together in accordance with this invention, heating devices for melting the hot-melt type adhesive agent are movably arranged on both sides of a position where the above-mentioned porous sheet is suspended.

In a further form of the device for gluing objects together in accordance with this invention, the above-mentioned objects to be glued together consist of parts of a meltable pattern used for casting.

The device of this invention is operated as follows: first, the porous sheet is supplied with adhesive agent, which is retained in the multitude of pores on the surface of the porous sheet. The porous sheet is then suspended in a condition allowing it to be pulled down, and held, on both sides thereof, by the adhesion surfaces of the objects to be glued together. Since the respective adhesion surfaces of the objects are formed as concavo-convex surfaces which are to be engaged with each other, the porous sheet is pulled by the adhesion surfaces in the direction thereof.

Since this porous sheet is suspended in a condition allowing it to be pulled down, it can be pulled in all directions toward the adhesion surfaces, so that the adhesive agent can be evenly applied to the entire adhesion surfaces.

Subsequently, these objects are separated from the above-mentioned porous sheet, the adhesive agent which has been retained in the pores of the porous sheet adhering to the respective adhesion surfaces of the objects. The porous sheet is then pulled upwards by means of the above-mentioned raising/lowering means, the objects being brought together so as to be glued to each other.

In the case where a hot-melt type adhesive agent is employed, the adhesive agent is supplied to the porous sheet after being melted by heating. When suspending the porous sheet which has been supplied with the adhesive agent, the heating devices are moved to positions on both sides thereof so as to heat the porous sheet, thereby preventing the hot-melt type adhesive agent on this sheet from curing.

If the above-mentioned porous sheet consists of a net, every part of it can evenly retain adhesive agent, and, since every portion of the sheet has the same thickness, the adhesive agent can be evenly applied to the entire adhesion surfaces of the objects to be glued together.

DETAILED DESCRIPTION OF THE PREFERRED EMBODIMENTS

An embodiment of this invention will now be described with reference to the accompanying drawings.

As stated above, this invention pertains to a method of and a device for gluing various objects together using a usual or a hot-melt type adhesive agent. The types of objects to be glued together in accordance with this invention are not particularly specified. Thus, they may, for example, be metals, plastics, wood, glass, ceramics, stone, fabrics, paper articles, etc. The following embodiment will be described as applied to the case where the parts of a meltable pattern for casting are glued together using a hot-melt type adhesive agent. Thus, the adhesive agent used in this embodiment is not restricted to the hot-melt type; it may be replaced by a usual one. Likewise, the parts of a meltable pattern may naturally be replaced by any one of the above-mentioned objects.

Figure 1:
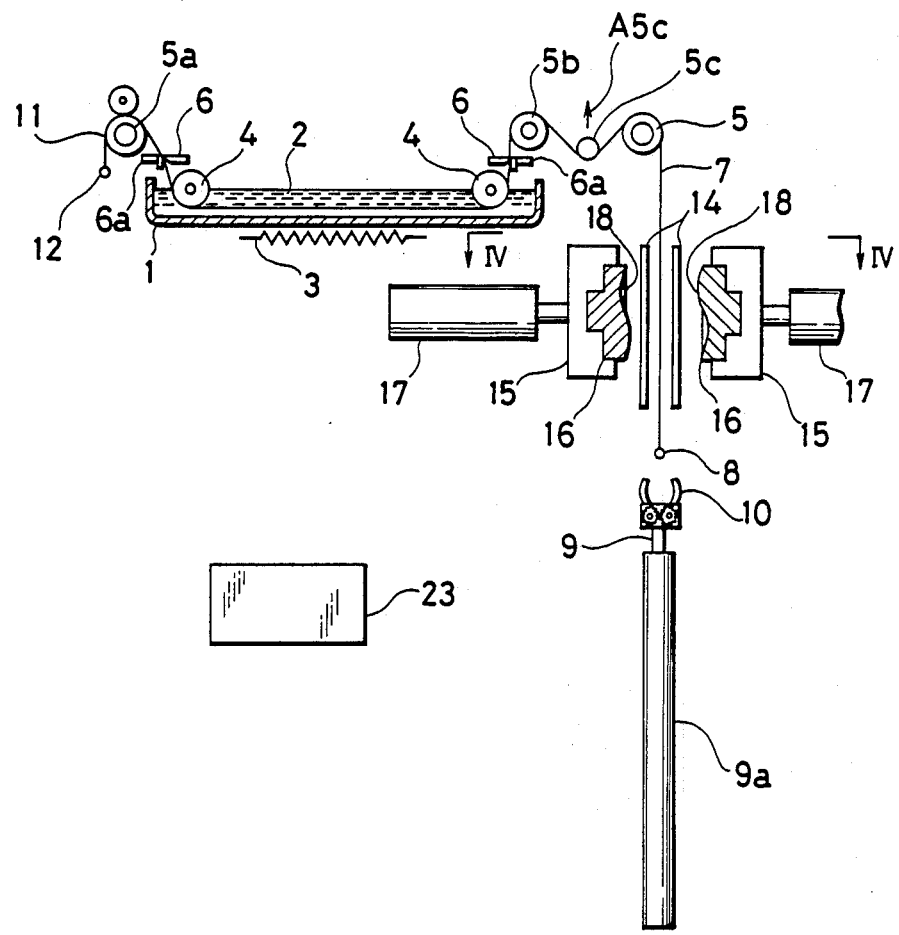
FIG. 1 is a diagram showing a process in a method of gluing objects together using a device in accordance with an embodiment of this invention.
Figure 2:
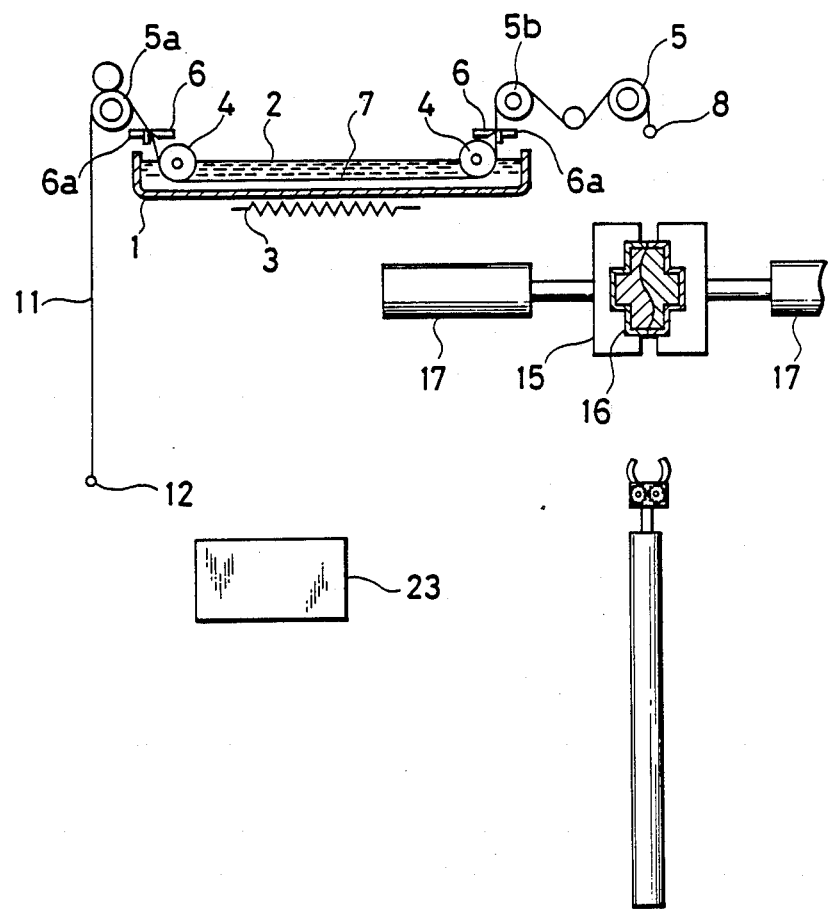
FIG. 2 is a diagram showing another process in the same method.

The embodiment shown in FIGS. 1 and 2 includes a vessel 1 for containing an adhesive agent 2 and a heating device 3. The adhesive agent 2 used in this embodiment is of a hot-melt type although it may also be the usual solvent type.

Figure 7:
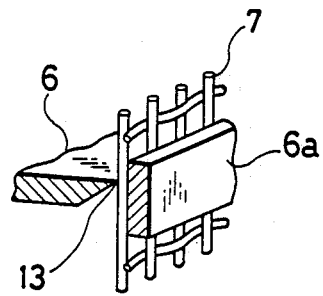
FIG. 7 is an enlarged perspective view of FIG. 1.
Figure 8:
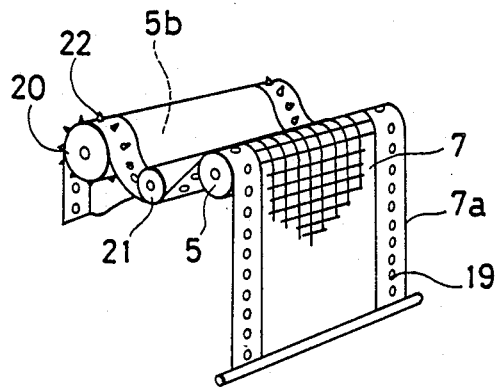
FIG. 8 is a perspective view of another embodiment of a device in accordance with another embodiment of this invention.

The adhesive agent 2 used is of the type which cures at room temperature and melts to a sufficient degree at a temperature in the range 130° C. to 180° C. or 190° C. to 210° C. A variety of adhesive agents of this type are now on the market, and their formulas will be omitted here since they are well known. The embodiment shown further includes rollers 4, heater rollers 5, 5a and 5b having built-in heaters, squeegees 6, 6a, which are shown in detail in FIG. 7, and a flexible porous sheet 7, which, in this embodiment, consists of a net of a synthetic fiber fabric. The flexible porous sheet 7 may also be of a metal, a natural fiber fabric, or a cloth. It may also consist of an elastic porous sheet made of rubber, polyurethane, etc. As for its pores, they may be through-holes extending through the sheet or just a multitude of recesses formed on its surface. The general configuration of the porous sheet 7 is not particularly specified as long as it is substantially formed as a sheet.

Figure 3:
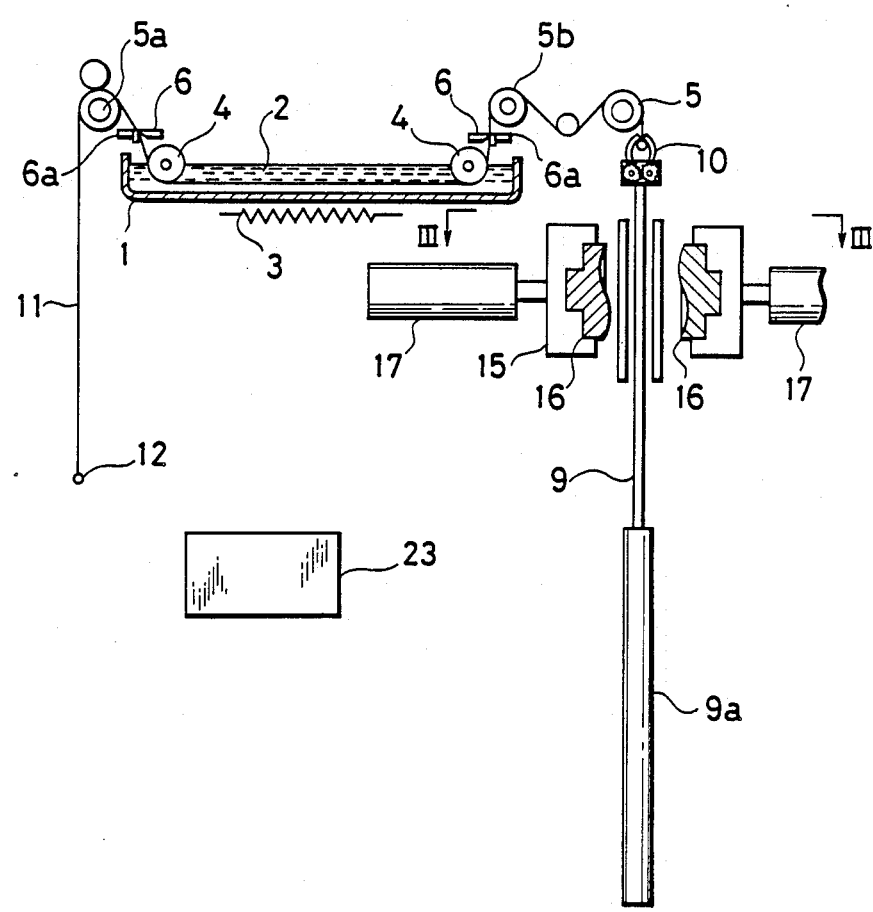
FIG. 3 is a diagram showing still another process in the same method.
Figure 5:
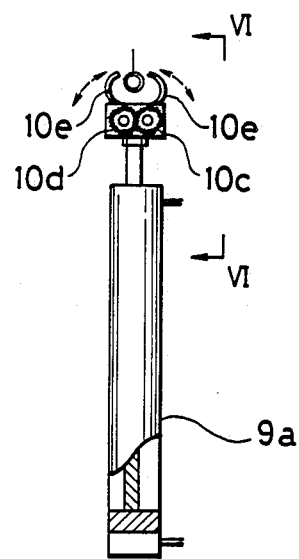
FIG. 5 shows a part of FIG. 1 in detail.
Figure 6:
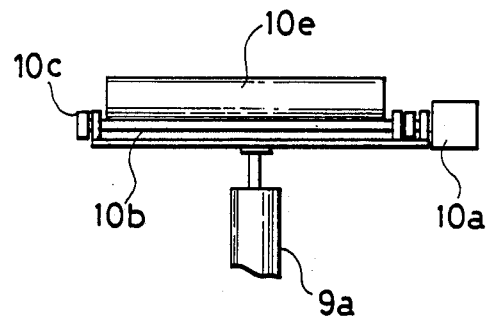
FIG. 6 is a diagram of the same embodiment as seen in the direction of the arrows VI—VI of FIG. 5.

The embodiment shown further includes a stopper section 8 provided at one end of the porous sheet 7. This stopper section 8 consists of a bar-like member which is made of silicone rubber and is adapted to be gripped by a lowering device 9. The lowering device 9 includes a gripping section 10 which can be moved in the vertical direction from the position shown in FIG. 1 to that shown in FIG. 3 by means of a linear actuator 9a. The gripping section 10 is adapted to grip the above-mentioned stopper section 8 of the porous sheet 7 and pulls it down to a certain position to release it there. When the stopper section 8 has been raised to a certain position, the gripping section 10 ascends thereto, as shown in FIG. 3, and grips the stopper section 8 again. The linear actuator 9a may consist, for example, of an air cylinder, as shown in FIG. 5. The gripping section 10 may, for example, have the construction shown in FIG. 6, which comprises an air 20 rotary actuator 10a, a shaft 10b adapted to make a reciprocating rotation through a certain angle by means of the air rotary actuator 10a, a shaft (not shown) engaged with the shaft 10b through the intermediary of gears 10c and 10d, and clamps 10e provided on either side of the shaft mentioned above, the clamps 10e opening and closing through the operation of the air rotary actuator 10a. The linear actuator 9a, the air rotary actuator 10a, etc. are connected to a controller 23. The porous sheet 7 is designed such that it retains any position to which it is brought by pulling down the engagement section 8 as described above. The reference numeral 11 indicates a string, which may be replaced by a wire, a chain or the like.

The reference numeral 12 indicates a weight. The rollers 4 as well as the heater rollers 5 and 5b are designed to race. The heater roller 5a is adapted to be driven in the direction in which the weight 12 is lowered and to race in the reverse direction.

The squeegees 6 and 6a define between them a gap 13 which is adjustable. The reference numeral 5c indicates a dancer roller which can move in the direction indicated by the arrow A5C.

The reference numeral 14 indicates heating devices for re-heating. These heating devices are designed to be movable in the direction perpendicular to the plane of FIG. 1 and is shown in more detail in FIG. 4.

Figure 4:
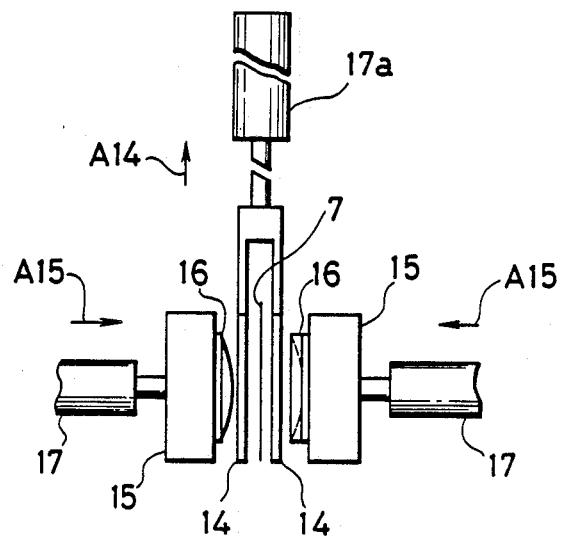
FIG. 4 is a diagram, partly omitted, of the same embodiment as seen in the direction of the arrows IV—IV of FIG. 1.

To avoid complications in the drawing, the lowering device 9 is omitted in FIG. 4. The component indicated by the reference numeral 17a in the drawing is a linear actuator, which may, for example, consist of an air cylinder. This linear actuator 17a is adapted to move the re-heating devices 14 in the direction indicated by the arrow A14 or reverse to that for the purpose of re-heating the porous sheet 7. When the lowering device 9 makes a vertical movement, the linear actuator 17a moves in the direction indicated by the arrow A14 so that it may not stand in the way of the device 9. Referring to FIG. 4 and FIG. 1, the reference numeral 16 indicates objects to be glued together, and the reference numeral 15 indicates holders for holding the objects 16. The holders 15 can move in the direction indicated by the arrow A15 or reverse to that by means of linear actuators 17, which may consist, for example, of a pneumatic or a hydraulic device.

The linear actuators 17a, 17, 17 are commonly connected to the controller 23.

Next, the objects 16 to be glued together may, for example, be the parts of a meltable pattern for casting. The parts are made of foam polystyrol and respectively exhibit concavo-convex adhesion surfaces 18, 18 which are in conformity with each other.

In the condition shown in FIG. 2, the hot-melt type adhesive agent 2 in the vessel 1 is melted by the heater 3, with the heater rollers 5, 5a and 5b emanating heat.

The porous sheet 7 is positioned in the vessel 1. The holders 15, 15 are separated from each other as shown in FIG. 1, holding the objects having the respective adhesion surfaces 18, 18 which are in conformity with each other.

As shown in FIG. 3, the lowering device 9 is moved upwards and grasps the stopper section 8 with its gripping section 10. It then brings the stopper section 8 down to the position shown in FIG. 1, where it opens the gripping section 10 to release the stopper section 8. As a result, the porous sheet 7 is suspended in the position shown in FIG. 1. In this position, the porous sheet 7 can be lowered still further, which will cause the dancer roller 5c to be raised. This further lowering is necessary for the porous sheet 7 to be deformed in accordance with the concavo-convex configuration of the adhesion surfaces 18, 18 when it is held between the objects 16, 16. The hot-melt type adhesive agent is then retained in a film-like form on the surface of the porous sheet due to the surface tension of the meshes thereof.

Since this adhesive agent easily cures at room temperature, the re-heating devices 14 are moved in a direction perpendicular to the plane of FIG. 1, from that side of the plane which is farther from the viewer to that which is nearer, to place the porous sheet 7 therebetween with certain gaps and to heat its surfaces, thereby melting the adhesive agent retained thereon.

Subsequently, the re-heating devices 14 are taken in a direction away from the viewer of FIG. 1, and the holders 15 are moved in a direction in which they come nearer to each other in such a manner as to put the objects 16 together with the porous sheet 7 therebetween, thereby allowing the adhesive agent on the porous sheet 7 to adhere to the objects 16, 16. The holders 15 are then withdrawn from each other, driving the heater roller 5a and lowering the weight 12, which causes the porous sheet 7 to be drawn up.

The heater roller 5a is also driven by the controller 23.

Next, the holders 15 are moved in a direction that brings them near to each other, thereby bringing the objects 16 together to glue them to each other. These operations are all performed by the controller 23 in an operational sequence.

The objects 16 which have been thus glued together are taken out of the holders 15. The object to be taken out may, for example, be a meltable pattern for casting made of foam styrol.

Instead of the lowering device 9, strips 7a of a fluororesin or some other synthetic resin may be provided on the edges of the porous sheet 7. These strips 7a are provided with perforations 19. The heater roller 5b is equipped with tooth-wheels 20 which are driven in the direction in which the porous sheet 7 is pulled down. The reference numeral 21 indicates a dancer roll, and 22 teeth on the tooth-wheels 20.

Further, the porous sheet 7 may be so designed as to emanate heat of itself by electricity, etc., although a pictorial presentation of such a construction is omitted here. This arrangement would allow the re-heating devices 14 and the device for moving the same to be dispensed with. As stated above, the porous sheet 7 is so designed that, when drawn up, it retains the position shown in FIG. 2, and when pulled down, that shown in FIG. 1.

Further, the heater roller 5a may be replaced by a takeup roller using a spring.

That would allow the weight 12 to be dispensed with. In the above example, ceramic panel heaters are employed for the re-heating devices 14. In the case where a net is employed for the porous sheet 7, an appropriate amount of adhesive agent can be retained by means of a mesh, so that gluing can always be effected with neither too much nor too little adhesive agent. Furthermore, since the lateral and lower ends of the porous sheet 7 are formed as free end sections, and the upper portion thereof is so formed as to be able to be pulled down, substantially like the free ends, by means of the dancer roller 21, the entire periphery of the porous sheet can be pulled inwards or restored to its original position, so that the porous sheet 7 can be deformed to a sufficient degree in accordance with the concavo-convex adhesion surfaces of the objects to be glued together, thereby allowing the adhesive agent to properly adhere to the adhesion surface.

Thus, in accordance with the method of this invention of gluing objects together, the adhesive agent is held in a multitude of holes or recesses in a porous sheet which is suspended so as to allow it to be pulled down, the adhesion surfaces of the objects to be glued together being brought together with the porous sheet therebetween so that the adhesion surfaces may come into contact with the porous sheet. As a result, the porous sheet can be deformed faithfully to the configuration of the adhesion surfaces of the objects to be glued together even if the adhesion surfaces have a concavo-convex configuration, so that the adhesive agent can be applied to the adhesion surfaces in a satisfactory manner, thereby allowing the objects to be glued together efficiently. Furthermore, the device in accordance with this invention allows objects having concavo-convex adhesion surfaces to be glued together with ease. Moreover, according to an aspect of this invention, a hot-melt type adhesive agent is used along with a heating device for melting the same, thereby allowing the parts of a meltable pattern for casting to be glued together easily and efficiently even if the parts have concavo-convex adhesion surfaces which are to be engaged with each other.

What is claimed is:

1. A method of gluing objects which have adhesion surfaces together, comprising the steps of: preparing a flexible porous sheet having a multitude of pores, suspending said porous sheet so as to allow it to be pulled down, allowing an adhesive agent to adhere to the multitude of pores of said porous sheet, bringing the adhesion surfaces of the objects to be glued together into contact with said porous sheet on both sides thereof so as to allow the adhesive agent to adhere to said adhesion surfaces of the objects to be glued together, separating said adhesion surfaces from said porous sheet, and bringing together the above mentioned adhesion surfaces before the adhesive agent has cured.

2. A method of gluing objects together as claimed in claim 1, wherein said porous sheet consists of a net.

3. A method of gluing objects together as claimed in claim 1, wherein said adhesive agent is a hot-melt type adhesive agent which is melted by heating.

4. A method of gluing objects together as claimed in claim 1, wherein the objects to be glued to each other consist of parts of a meltable pattern used for casting.

5. A device for gluing objects together, comprising: a flexible porous sheet, a means for supplying adhesive agent to said porous sheet, a raising/lowering means for suspending said porous sheet so as to allow it to be pulled down, and a retaining/moving means provided on both sides of said porous sheet that is suspended and adapted to be used for retaining objects to be glued together and moving these objects in the direction of said porous sheet as well as in a direction reverse thereto.

6. A device for gluing objects together as claimed in claim 5, wherein said porous sheet consists of a net.

7. A device for gluing objects together as claimed in claim 5, wherein said adhesive agent is a hot-melt type adhesive agent, and wherein said means for supplying an adhesive agent to said porous sheet includes a heating device for heating said hot-melt type adhesive agent for the purpose of melting the same.

8. A device for gluing objects together as claimed in claim 7, wherein heating devices for melting the hot-melt type adhesive agent are movably arranged on both sides of a position where said porous sheet is suspended.

9. A device for gluing objects together as claimed in claim 5, wherein said objects to be glued together consist of parts of a meltable pattern used for casting.

10. A method of gluing objects together as claimed in claim 2 wherein the objects to be glued to each other consist of parts of a meltable pattern used for casting.

11. A device for gluing objects together as claimed in claim 6 wherein said adhesive agent is a hot-melt type of adhesive agent, and wherein said means for supplying an adhesive agent to said porous sheet includes a heating device for heating said hot-melt type adhesive agent for the purpose of melting the same.

12. A device for gluing objects together as claimed in claim 6 wherein said objects to be glued together consist of parts of a meltable pattern used for casting.

13. A device for gluing objects together as claimed in claim 8 wherein said objects to be glued together consist of parts of a meltable pattern used for casting.

* * * * *